Patented Nov. 6, 1951

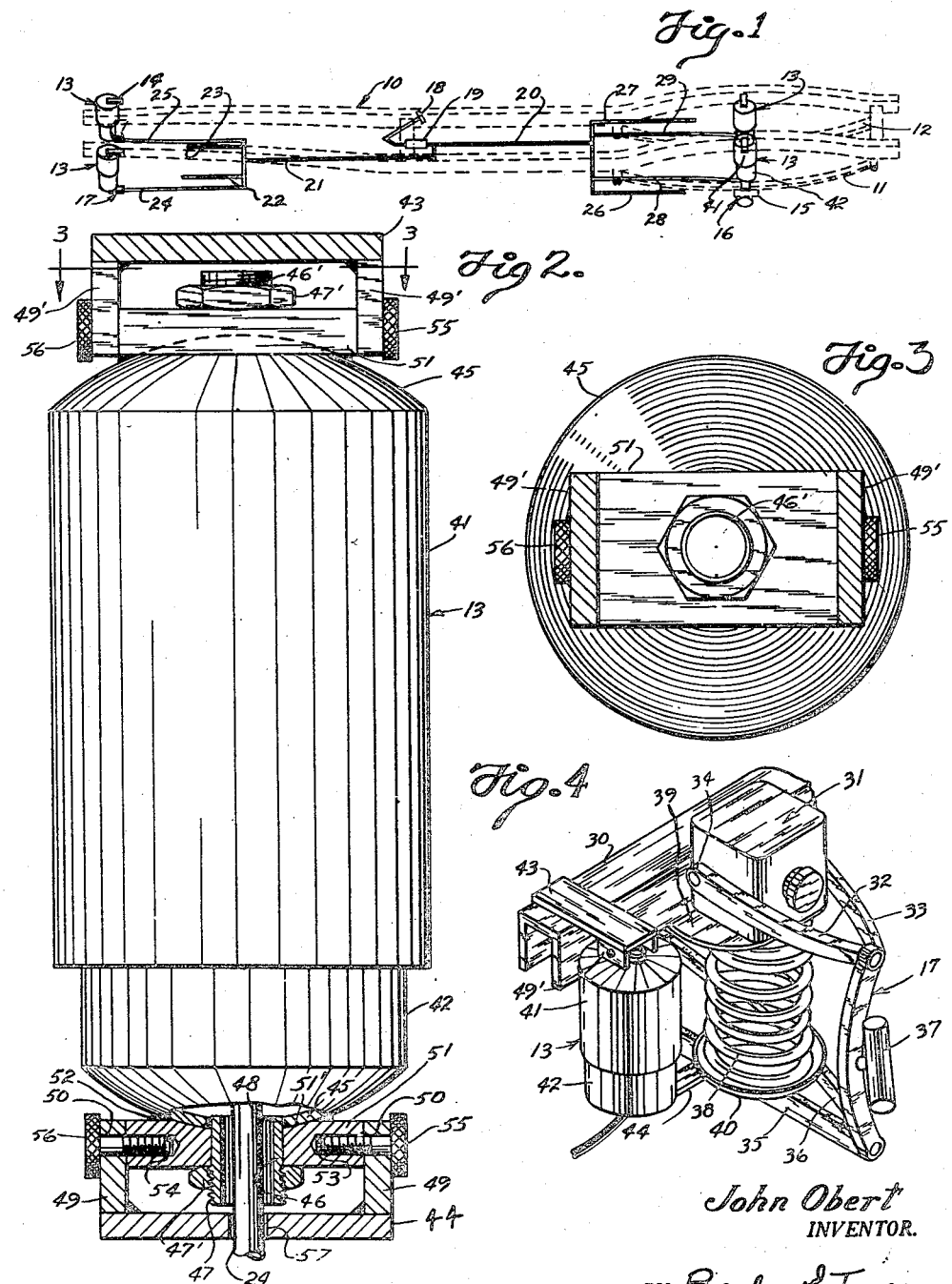

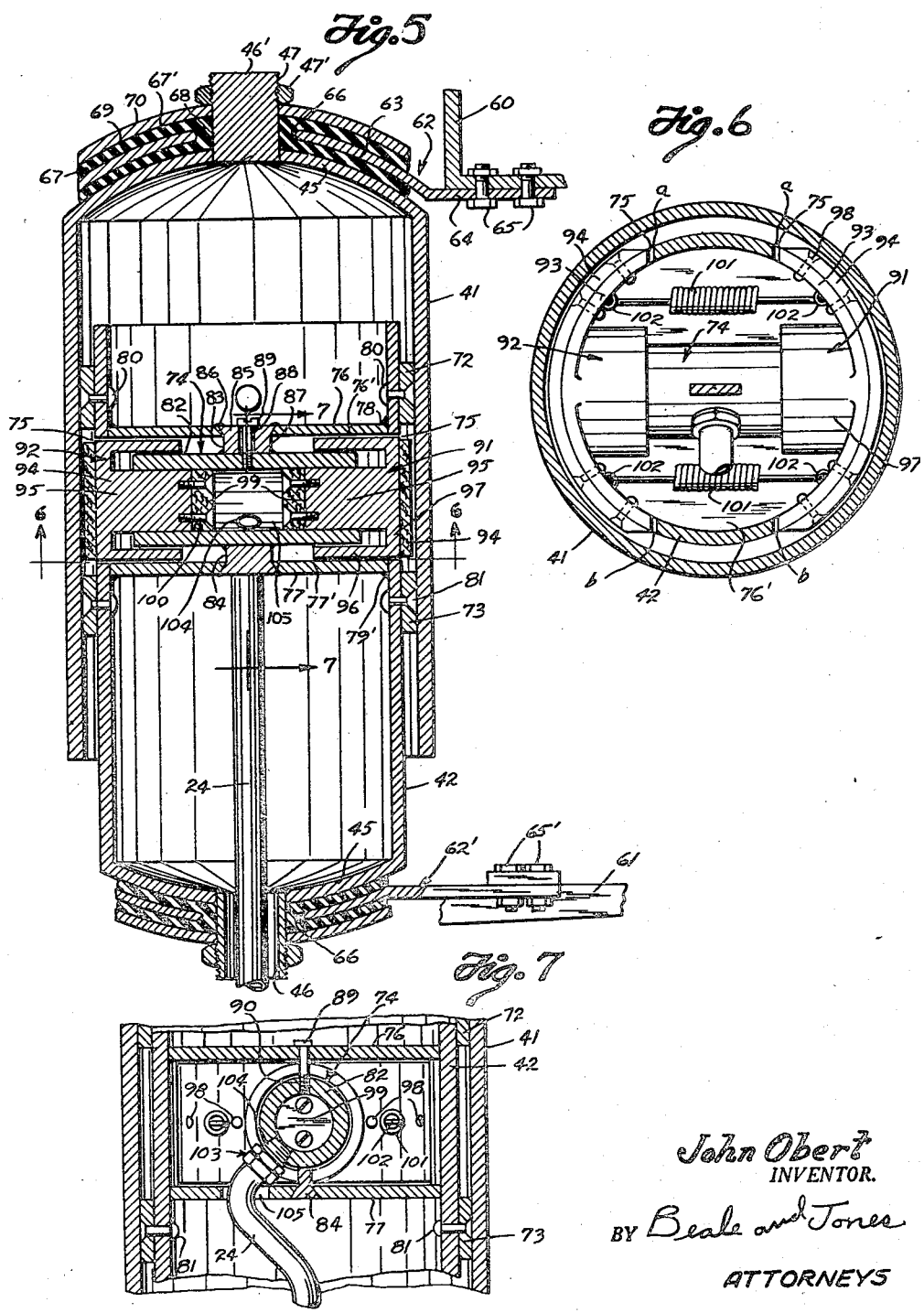

2,574,280

UNITED STATES PATENT OFFICE 2,574,280

VEHICLE BRAKE DIVING CONTROL

John Obert, Omaha, Nebr.

Application August 5, 1949, Serial No. 108,703

9 Claims. (Cl. 280—124)

This invention relates to apparatus adapted to be attached to an automobile to eliminate brake diving during periods of deceleration. More particularly this invention relates to a mechanism that is interposed between the vehicle frame and the wheel support to prevent vertical movement therebetween when the brakes are applied on the vehicle.

Motor vehicles are provided with resilient spring connections disposed between the vehicle frame with its attached body and the wheel supports. When the brakes are applied in such a vehicle as it is moving and particularly during periods of accentuated deceleration, relative vertical movement takes place between the frame with its attached body and the wheels and their axles or immediate supporting members. This vertical movement is referred to as "dive." The diving action may be traced by visualizing a moving vehicle and appreciating that when the brakes are applied the forward motion of the axles and wheels of the vehicle is stopped. The body and frame structure being connected to the axles by a spring suspension continues to move in the original forward direction of movement of the vehicle due to the inertia of the body and frame structure. This movement of the latter is slowly arrested by the spring suspension and, in doing so, the body and frame structure first moves forwardly with respect to the vehicle axle and then downwardly as though it were pivoting or swinging around the axle.

There are certain disadvantages present when this "dive" phenomena takes place. The front bumper drops downward and causes misalignment with the bumper of the car in front and in case of collision with such forward vehicle much damage may be caused to the front end of the vehicle, such as the fenders, grille work and radiator. If this relative vertical movement of the frame and its attached body with the wheel support is prevented, the bumpers may better serve their purpose in protecting the front and rear end of automobiles from damage.

It is an object of this invention to provide a mechanism that may be attached to a vehicle and made operable from the brake system thereof to prevent vertical movement between the vehicle frame and the wheel supports when the brakes are applied.

A further object of this invention is to provide a mechanism that is easily attached to a vehicle to prevent brake diving and which will not interfere with the normal action of the vehicle springs during non-braking periods.

A further object of this invention is to provide a mechanism consisting of a pair of cylinders, wherein one reciprocates within the other, with one of the cylinders attached to a vehicle frame and the other to a wheel support spring biased from the frame so that the cylinders extend substantially vertical with one of the cylinders having a movably mounted brake shoe which is operatively connected with the brake system of the vehicle, whereby application of the vehicle brakes moves the brake shoe into locking engagement with the other cylinder so as to prevent relative movement of the cylinders and vehicle frame with respect to the wheel support.

For a more complete understanding of the nature and scope of my invention, reference can be had to the following detailed description taken in connection with the accompanying drawings in which;

Figure 1 is a perspective view of a vehicle chassis having mounted thereon the anti-brake dive mechanisms shown connected with the customary hydraulic braking system of the vehicle;

Figure 2 is a side elevation of the anti-brake diving mechanism showing in fragmentary section at each end one form of attaching means;

Figure 3 is a plan view along the line 3—3 at the upper end of Figure 2;

Figure 4 is an enlarged perspective view of the front left wheel support showing the installation of the anti-brake dive mechanism;

Figure 5 is a vertical cross-section of the anti-brake dive mechanism showing also another form of mounting for the mechanism;

Figure 6 is a sectional view taken along the line 6—6 at about the center of Figure 5; and Figure 7 is a partial sectional view taken along the line 7—7 of Figure 5.

Referring to Figure 1, there is shown a vehicle frame in a chassis generally indicated at 10 having rear springs 11 and 12. Anti-brake dive mechanisms are indicated generally at 13 for each of the four wheels (not shown) having their upper ends attached to the vehicle frame by a bracket 14 while their lower ends are attached by a bracket 15 to the wheel support generally indicated at 16 for the rear wheels and at 17 for the front wheels, see Figure 4.

At 18 is indicated the foot pedal controlling the master fluid cylinder 19 which in turn controls the hydraulic braking system of the vehicle and the anti-brake dive mechanisms. The master cylinder 19 is connected through rearwardly leading hydraulic line 20 and forwardly leading hydraulic connecting line 21 connecting respectively to the rear and front brakes. Branch lines 22 and 23 lead to the forward wheel brakes while branch lines 24 and 25 lead respectively to the forward pair of anti-brake dive mechanisms 13. Branch lines 26 and 27 lead from the rearwardly extending hydraulic line 20 to the rear wheel brakes while branch lines 28 and 29 lead to the rear pair of anti-brake dive mechanism 13.

While a pair of anti-brake dive mechanisms are shown mounted between rear wheel mountings and the frame of the vehicle these are not necessarily required to prevent the front diving of the vehicle which takes place when the brakes are applied which causes the vehicle frame and body thereon to move downward and toward the front wheel supports. This generally vertical or perpendicular movement between front end of the frame and the front wheel supports can be prevented by the anti-brake mechanisms mounted on the forward end of the vehicle. However, when the vehicle is decelerated in its forward movement, the rear end of the frame tends to move upwardly with respect to the rear wheel supports while the front end of the frame tends to move downwardly towards the front wheel supports and thus the use of a pair of the anti-brake dive devices at the rear of the frame prevent relative movement of the rear end of the frame with respect to the rear wheel mountings while the forward pair of anti-brake dive mechanisms prevent the forward end of the frame from moving vertically downward and toward the front wheel supports. When the vehicle suddenly approaches a vehicle ahead and the brakes are quickly applied, the front bumper of the vehicle tends to drop down and if it comes in contact with the rear bumper of the vehicle ahead, it will skim underneath that bumper causing the grille work and other parts of the rear vehicle to be damaged and thus the bumpers on both of the vehicles do not fully serve their intended purpose. By use of the anti-brake dive mechanism this vertical movement or diving movement of the bumper on the rear vehicle is prevented when the brakes are applied and thus the bumper stays in proper alignment so that it will more readily serve its intended purpose of protecting the forward end of the vehicle should the vehicle run into the rear bumper of another vehicle ahead.

In Figure 4 the front left wheel support 17 of the vehicle chassis of Figure 1 is shown in an enlarged perspective view. This is illustrative of one form of front wheel support, however, the anti-brake diving mechanism, according to my invention, may equally as well be interposed between the frame and the front wheel support which is spring biased from the frame in other types of front end suspensions. The forward end of the left longitudinal frame member is indicated at 30 and a shock-absorber connecting device is generally indicated at 31 fixed to the outer face of frame member 30 near its forward end. The front wheel support 17 comprises a pair of upper support links 32 and 33 pivoted at 34 to the shock-absorber device 31, and a pair of lower support links 35 and 36 each of which upper and lower support links are pivotally connected at their outer ends to the ends of a steering knuckle 37 to which the front wheel axle, not shown, is attached. Interposed between the wheel support 17 and the frame member 30 is a customary coil spring 38, the upper end of which is seated in a plate 39 secured to frame member 30 while the lower end of the spring is seated in a plate 40 secured to the lower pair of support links 35 and 36.

Still referring to Figure 4, the anti-dive mechanism 13 is comprised of an upper and outer cylindrical member 41 and a lower and inner cylindrical member 42 telescopically mounted within the cylindrical member 41. The upper end of cylinder 41 is pivotally connected to a bracket 43 attached to and extending transversely outward from the end of frame member 30. The lower end of the cylindrical member 42 of the anti-brake dive device 13 is pivotally attached to the lower pair of support links 35 and 36 of the wheel support 17 by a forwardly extending bracket 44. The details of the pivotal attachment of the anti-brake dive device 13 of Figure 4 are shown in Figures 2 and 3.

Referring to Figure 2, there is shown the attaching means for the anti-brake dive mechanism 13 shown in Figure 4. The upper and outer cylinder 41 and lower and inner cylinder 42 are similarly attached and only the attachment for the lower cylinder 42 is fully described. A dish-like or hemispherical plate 45 is attached to the lower end of lower and inner cylinder 42 and the upper end of cylinder 41 as by welding. Each end plate 45 is apertured at its center to receive a depending nipple 46 threaded at 47 and secured as by welding at 48 to the end plate. Upstanding lugs 49—49 are welded to the ends of bracket 44, see Figure 2 and 4, and at their upper ends are apertured as at 50. Similar lugs 49' depend from upper bracket 43 as illustrated at the upper portion of Figure 2. An attaching plate 51 of rectangular shape, see Figure 3, is formed with a concave portion 51' to fit against end plate 45 and is apertured at its center to fit over nipple 46. Plate 51 is welded as indicated at 52 to end plate 45. A nut 47' is screwed onto the threaded end 47 of nipple 46 to further secure cylinder 42 to attaching plate 51. Attaching plate 51 is provided with threaded recesses 53 and 54 at each end and in line with apertures 50 in lugs 49 to receive pivot mounting screws 55 and 56 which pivotally connect attaching plate 51 with the lugs 49 on bracket 44. Thus, the lower and inner cylinder 42 is pivotally connected with the bracket 44 attached to the wheel support generally indicated at 17 in Figure 4. The upper and outer cylinder 41 is similarly attached to the bracket 43 which is secured to the vehicle frame member 30, see Figure 4. Lower attaching bracket 44 is apertured at 57 in line with the lower nipple 46 so that the hydraulic brake fluid lead 24 of flexible tubing may pass therethrough to the braking mechanism within anti-brake dive mechanism 13 to be described.

In Figure 3 there is shown a section view along line 3—3 at the upper end of Figure 2. The upper nipple 46' is of solid material and serves to seal off the upper end of upper cylinder 41 to prevent entrance of water, dirt and foreign material.

Referring now to Figure 5, there is illustrated a longitudinal cross section through the center of the anti-brake diving mechanism 13 shown in Figure 2, however, a modified form of attaching means for the cooperating reciprocable cylinders 41 and 42 is shown. The anti-brake diving mechanism 13 is mounted in a substantially vertical position between frame member 60 of the vehicle chassis and the wheel support member 61 shown fragmentarily. Instead of the pivotal mounting shown in Fig. 2, a limited yieldable mounting is used in this modified form of attaching means. An upper bracket generally indicated at 62 is formed with a part hemispherical portion or dish-like portion 63 corresponding in curvature to the part hemispherical or dish-like end plate 45 on the end of cylinder 41 and has a horizontally extending lug portion 64 which is secured to the frame 60 by bolts 65. A lower bracket 62' like bracket 62 having its dish-like portion extending with the curvature of end plate 45 on lower and inner cylinder 42 is attached as by bolts 65' to wheel support member 61. A spring member, not shown in Figure 5, but similar to spring member 38 of Figure 4 is likewise disposed between the frame member 60 and wheel support member 61 in the full assembly. Brackets 62 and 62' are each apertured at their centers at 66. Extending through the aperture 66 in upper bracket 62 and in spaced relation thereto is the solid nipple 46'. Extending through the aperture 66 in lower bracket 62' and in spaced relation thereto is lower nipple 46. Interposed between the end plate 45 and the dish-like portion 63 of bracket 62 is a specially formed washer generally indicated at 67 made of a limited yieldable material such as rubber or leather. Washer 67 is of a cylindrical shape, has an aperture 68 at its center to fit about the nipple 46' and is provided with an annular cavity 69 which fits over the dish-like portion 63 of bracket 62. A dish-like or part hemispherical cap plate 70 apertured at its center to fit over nipple 46' is held against the outer surface 61' of washer 67 by nut 47' screwed onto the threaded end 47 of nipple 46'. This cap 70 held down by the nut 47' securely attaches the cylinder 41 to bracket 62, however, the washer 67 allows a limited amount of play between bracket 62 and cylinder 41. The lower and inner cylinder 42 is similarly attached to bracket 62'.

The brake means within anti-brake diving mechanisms 13 to prevent relative movement between cylinders 41 and 42 shown in Figures 5, 6 and 7 will now be described. Lower cylindrical member 42 carries the guide bushings 72 and 73 as well as the brake mechanism generally indicated at 74 which is actuated when the brakes on the vehicle are applied to prevent relative movement between cylinders 41 and 42. When relative movement between cylinders 41 and 42 is prevented, relative movement is also prevented between frame member 60 on the chassis and the wheel support 61 to accomplish the anti-brake diving feature according to my invention.

Still referring to Figures 5, 6 and 7, lower and inner cylinder 42 has two diametrically opposite cut out annular portions or slots 75 extending from a to b, see Figure 6, in its wall. The major axes of these slots 75 lies in a plane that is perpendicular to the common vertical axis of telescopically mounted cylinders 41 and 42 and is positioned about one third the way down from the upper end of cylinder 42. A transversely extending circular upper plate 76 and a like transversely extending circular lower plate 77 each having a diameter equal to the inside diameter of cylinder 42 are secured as by welding at 78 and 79' respectively to the inside of cylinder 42 so that the lower surface 76' of upper plate 76 is in line with the upper edge of annular slots 75 and the upper surface 77' of lower plate 77 is in line with the lower edge of annular slots 75.

The upper guide bushing 72 of bronze material of annular shape is secured as by rivets 80 to the outer surface of cylinder 42 and in adjacent spaced relationship to the upper edges of slots 75 in the wall of cylinder 42, see Figure 5. A similar but lower guide bushing 73 is secured as by rivets 81 to the outer surface of cylinder 42 in adjacent spaced relationship to the lower edges of slots 75 in the wall of cylinder 42. These bushings 72 and 73 form a sliding fit against the inside adjacent wall surfaces of outer and upper cylinder 41 and permit a smooth telescopic working of cylinders 41 and 42.

Still referring to Figures 5, 6 and 7, a transversely extending brake actuating cylinder 82 is mounted intermediate upper plate 76 and lower plate 77 and in spaced relation thereto by an upper web member 83 and a lower web member 84. Upper plate 76 is apertured to receive the upper flared head 85 of web 83 to which it may be welded as by welding at 86 and the lower end of web 83 is welded to the adjacent abutting surface of cylinder 82 by welding indicated at 87. Web 83 is apertured at its center at 88 to receive a bleed off screw 89 which is screwed into a threaded aperture 90 in the upper surface of cylinder 82. Lower web 84 is similarly attached to lower plate 77 and the lower portion of cylinder 82. Webs 83 and 84 form a rigid support for cylinder 82 in its transverse position which is perpendicular to the common vertical axis of cylinders 41 and 42.

A pair of movable braking members having integrally formed or attached pistons generally indicated at 91 and 92 are mounted to reciprocate within the right and left ends respectively of cylinder 82. Movable braking member 91 is like movable braking member 92 and is formed with an arcuate brake shoe portion 93 and a transversely extending cylindrical boss 97 on the center concave portion of arcuate brake shoe portion 93. This cylindrical boss 97 is formed with a piston 95 at its center, see Figure 5, and and in spaced relation thereabout an annular cylindrical shoulder 96. The brake shoe portion 93 is of the same arcuate shape as slot 75 in the wall of cylinder 42 within which it is positioned when in retracted position, see Figure 6. A brake shoe lining 94 is attached to the outer face of brake shoe portion 93 by rivets 98 and thus forms a friction locking means with the adjacent inner surface of outer cylinder 41 when piston portion 95 of movable brake member 91 is forced outward by hydraulic pressure applied through brake fluid conduit 24. The outer diameter of annular cylindrical shoulder 96 on movable brake members 91 and 92 is slightly less than the spacing between plates 76 and 77 and thus the movable brake members 91 and 92 have a free reciprocation therebetween in a transverse direction. Each piston portion 95 is of such a diameter that it has a close sliding fit with the inner adjacent surface of cylinder 82 and each is provided with an oil seal washer 99 on their ends which is secured by screws 100 to the end of piston 95.

In Figure 6 a pair of springs 101 connected by lugs 102 on the inside of each of the brake shoes 93 hold each of the braking members 91 and 92 in retracted position when sufficient oil pressure is removed from the oil seal washer 99 on the end of each of the pistons 95. Thus, the brake mechanism 74 interposed between cylinders 41 and 42 is retracted so as to permit a free reciprocable movement of the cylinders when the vehicle brakes are not operated.

In Figure 7 brake fluid line 24 which is of a flexible oil tight material is secured at its outer end by a fitting generally indicated at 103 which is screwed into a threaded aperture 104 formed in the wall of cylinder 82 midway its length and in its lower surface. Lower plate 77 is apertured at 105 to permit brake fluid line 24 to pass therethrough. Brake fluid fills the chamber 105 within cylinder 82 and the sealing end washers 99 on the pistons 95. Chamber 105 is in communication with the hydraulic brake fluid conduit 24 through the aperture 104.

*Operation*

The vehicle comprising the chassis 10 is deaccelerated by actuation of the foot pedal 18 which controls the master cylinder 19 of the fluid brake system. Pressure is thus applied to the fluid in the conduits leading from the master cylinder to the forward wheel brake branch conduits 22 and 23 and to the rear wheel brake branch conduits 27 and 28. Fluid pressure is also transmitted through the branch conduits 24 and 25 leading to the forward anti-brake diving mechanisms 13 as well as the rearwardly leading conduits 28 and 29 to the anti-brake diving mechanisms mounted at the rear of the chassis.

The anti-brake diving mechanisms 13 are positioned substantialy vertically between the chassis frame and the wheel supports. The frame of the chassis is biased from the wheel supports by the normal spring mountings. As deceleration takes place especially when there is accentuated deceleration, the frame will tend to move toward the front wheel supports 17, see Figure 4, while there will be a tendency for the rear end of the frame to move upward as expained hereinbefore. This movement of the frame with respect to the wheel supports is prevented by the anti-brake diving mechanisms 13 according to my invention which are actuated at the same time the brakes are applied.

Referring to Figure 5, for example, the fluid pressure from the master cylinder 19 is transmitted through the flexible conduit lead 24 to the locking or brake mechanism generally indicated at 74 which acts to lock cylinder 41 to cylinder 42 and prevent relative movement therebetween. To carry out this anti-brake diving feature, the brake fluid in conduit 24 communicates with the brake fluid filling chamber 105 between the ends of pistons generally indicated at 91 and 92 in cylinder 82. Thus, pressure applied through the fluid at the ends of pistons 91 and 92 forces them outward and the brake lining 94 carried on the brake shoes 93 which are connected integrally with the pistons is forced against the inner adjacent surface of outer cylinder 41 whereby relative movement between cylinders 41 and 42 is prevented. Cylinder 41 being attached to the frame 60, see Figure 5, and cylinder 42 being attached to the wheel support as at 61, relative movement between the frame and the wheel support is prevented.

As the brakes are released by easing up on brake pedal 18, fluid pressure is released on the movable brake members 91 and 92 to allow the normal relative movement between cylinders 41 and 42 and the normal relative movement between the frame and the wheel supports. Springs 101 interconnecting the movable brake members 91 and 92 draw these brake members toward each other into their non-braking position. Thus, there is permitted relative movement between the cylinders 41 and 42 and relative movement between the frame and the wheel supports when the brakes are not applied.

Since it is obvious that certain changes can be made in the foregoing constructions without departing from the spirit and scope of this invention, it is intended that all matter shown in the accompanying drawings or described hereinbefore shall be interpreted as illustrative and not in a limiting sense.

I claim as my invention:

1. In a vehicle having a frame, a wheel assembly, a resilient suspension system between said frame and assembly, and also having a fluid braking system; a first member extending downwardly from said frame and being attached at its upper end to said frame, a second member extending upwardly from said wheel assembly and being attached at its lower end to said assembly, said first and second members being disposed adjacent one another and normally relatively movable with respect to each other, and fluid operable brake means mounted on one of said members for engaging the other of said members for preventing relative movement between said first and second members, said fluid operable brake means being operably responsive to the fluid pressure in said braking system during brake application.

2. In combination, a vehicle frame, a spring connected therewith, a wheel support connected with the spring, a first cylinder connected to and extending downwardly from the frame, a second cylinder connected to and extending upwardly from the wheel support, said first and second cylinders being telescopically disposed and normally telescopically movable with respect to each other, fluid operable brake means mounted on one of said cylinders for engaging the other of said cylinders to prevent telescopic movement between the cylinders, a brake system for the vehicle, and means connecting the fluid operable brake means and the brake system for operating the fluid operable brake means upon operation of the brake system.

3. In a motor vehicle having a chassis frame, a suspension system having spring means spacing the frame and wheel support means vertically, and hydraulically operated brake actuated mechanism, said mechanism including a master fluid cylinder, fluid conduits leading from the cylinder to the brake mechanism, and means operated by the brake pedal for forcing the fluid from the master cylinder through the conduits; a first cylinder member connected to and extending downwardly from the frame, a second cylinder member connected to and extending upwardly from the wheel support, said cylinder members being telescopically disposed and normally telescopically movable with respect to each other, fluid actuated brake means mounted on one of said cylinders for engaging the other of said cylinders for preventing telescopic movement between the said cylinder members, and an auxiliary conduit connecting one of the brake fluid conduits with the fluid actuated brake means for the cylinder members whereby application of the brakes automatically actuates said fluid actuated brake means for the cylinders to prevent telescopic movement therebetween and to prevent relative movement between the frame and the wheel support.

4. In a motor vehicle having a chassis frame, a suspension system having spring means spacing the frame and wheel support means vertically, and hydraulically operated brake actuated mechanism, said mechanism including a master fluid cylinder, fluid conduits leading from the cylinder to the brake mechanism, and means operated by the brake pedal for forcing the fluid from the master cylinder through the conduits; a first cylinder member connected to and extending downwardly from the frame, a second cylinder member connected to and extending upwardly from the wheel support, said cylinder members being telescopically disposed and normally telescopically movable with respect to each other, fluid actuated locking means for preventing telescopic movement between the first and second cylinder members comprising, a fluid brake cylinder attached to one of said telescopic cylinders and a movable brake member operable in said fluid brake cylinder for engagement with the other telescopic cylinder, and an auxiliary conduit connecting one of the brake fluid conduits with the locking means for the cylinder members whereby application of the brakes automatically actuates said locking means for the cylinders to prevent telescopic movement therebetween and to prevent relative movement between the frame and the wheel support.

5. Mechanism of the character described in claim 4 wherein the fluid actuated means for preventing telescopic movement between said telescopic cylinder members comprises a transversely extending fluid brake cylinder open at each end and attached to the inner of said telescopic cylinders and a pair of movable brake members having piston portions mounted respectively in each open end of said transversely extending fluid brake cylinder for engagement with the outer of said telescopic members when fluid pressure is applied to the fluid in said fluid brake cylinder.

6. Mechanism of the character described in claim 4 wherein the inner of said telescopic cylinders has a pair of oppositely disposed arcuate slots in its wall having their axes lying in a plane which is perpendicular to the longitudinal axis of said inner cylinder, and including a pair of circular bearing bushings between said telescopic members and secured to the outer surface of said inner cylinder adjacent the edges of said arcuate slots, a transversely extending fluid brake cylinder open at each end attached to and within the inner cylinder having its axis lying in the plane containing said axes of the arcuate slots, and a pair of movable brake members within said arcuate slots in the inner cylinder and having piston portions mounted respectively in each open end of said transversely extending fluid brake cylinder for engagement with the outer of said telescopic members when fluid pressure is applied to the fluid in said fluid brake cylinder.

7. Mechanism of the character described in claim 6 including spring means connecting said movable brake members for retracting the movable brake members toward each other when fluid pressure is released from said brake locking means.

8. In combination with an automobile vehicle equipped with a hydraulic brake system including a master fluid cylinder and a manual operating member therefor, a frame, a wheel support and a spring suspension interposed between said frame and said wheel support; a first cylindrical member extending downwardly from said frame, means connecting the upper end of said first cylinder and the frame, a second cylinder member extending upwardly from said wheel support, means connecting the lower end of said second cylinder and the wheel support, said cylinder members being telescopically disposed and normally telescopically movable with respect to each other, fluid actuated locking means for preventing telescopic movement between said first and second cylinder members, said locking means comprising a transversely extending fluid brake cylinder attached to the inner of said telescopic cylinders and a pair of movable brake members for engagement with said outer cylinder having piston portions extending within said transversely extending fluid brake cylinder, an auxiliary conduit connecting said hydraulic brake system and said fluid brake cylinder whereby application of the brakes automatically moves said movable brake members into braking engagement with said outer cylinder member to prevent telescopic movement between said cylinder members and relative movement between the frame and the wheel support, and means for retracting said movable brake members when fluid pressure is released from said fluid brake cylinder.

9. In combination with an automotive vehicle equipped with a hydraulic brake system including a master fluid cylinder and a manual operating member therefor, a frame, a wheel support and a spring suspension interposed between said frame and said wheel support, the improvement consisting of an anti-brake diving mechanism interposed between said frame and said wheel support comprising, a first member extending downwardly from said frame and being attached at its upper end to said frame, a second member extending upwardly from said wheel support and being attached at its lower end to said wheel support, said first and second members being disposed adjacent one another and normally relatively movable with respect to each other, fluid operable brake means mounted on one of said members for engaging the other of said members to prevent relative movement therebetween, fluid operated means for actuating said fluid operable brake means, and a fluid conduit between said master fluid cylinder and said fluid operable brake means whereby application of the brakes automatically actuates said fluid operable brake means to prevent relative movement between said members and relative movement between said frame and wheel support.

JOHN OBERT.

REFERENCES CITED

The following references are of record in the file of this patent:

UNITED STATES PATENTS

| Number | Name | Date |
| --- | --- | --- |
| 2,018,502 | Paton | Oct. 22, 1935 |
| 2,131,014 | Sanford | Sept. 20, 1938 |
| 2,184,202 | Tschanz | Dec. 19, 1939 |
| 2,289,907 | Friedlaender | July 14, 1942 |
| 2,357,619 | Tack | Sept. 5, 1944 |